United States Patent [19]
Haraden

[11] Patent Number: 4,779,021
[45] Date of Patent: Oct. 18, 1988

[54] ELECTRIC LAMP WITH IMPROVED SELF-MOUNTING FRAME MEMBER

[75] Inventor: Thomas Haraden, Ipswich, Mass.

[73] Assignee: GTE Products Corporation, Danvers, Mass.

[21] Appl. No.: 18,801

[22] Filed: Feb. 17, 1987

Related U.S. Application Data

[63] Continuation of Ser. No. 729,373, May 1, 1985, abandoned.

[51] Int. Cl.$^4$ .............. H01J 1/88; H01J 5/46; H01J 61/34; H01J 61/36
[52] U.S. Cl. .................... 313/25; 313/318; 362/382
[58] Field of Search ............ 313/25, 252, 315, 318; 362/382, 396

[56] References Cited

U.S. PATENT DOCUMENTS

| | | | |
|---|---|---|---|
| 3,622,947 | 11/1971 | Griffen | 313/318 X |
| 4,500,948 | 2/1985 | Blaisdell et al. | 362/382 |
| 4,565,944 | 1/1986 | Beurskens et al. | 313/318 |

FOREIGN PATENT DOCUMENTS 2136201A  9/1984  United Kingdom ............... 313/579

Primary Examiner—Leo H. Boudreau
Assistant Examiner—K. Wieder
Attorney, Agent, or Firm—Joseph S. Romanow; José W. Jimenez

[57] ABSTRACT

This invention provides an improved electric lamp with a self-mounting frame member for mounting a light source capsule within an outer envelope. The improvement lies in the lamp's inclusion of means for substantially preventing rotational movement of the frame member when the frame member is mounted and secured by a base member. Rotational movement preventing means is located about the outer envelope's neck portion and forms part of the frame member. Rotational movement preventing means includes a grooveless brim on the neck portion, a pair of grooves on the outer surface of the neck portion and a frame member with mounting means positioned about the brim and mated with the grooves of the neck portion.

8 Claims, 3 Drawing Sheets

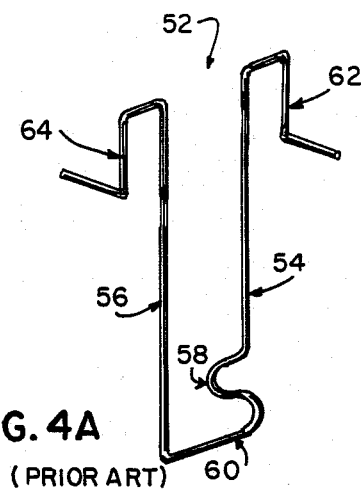
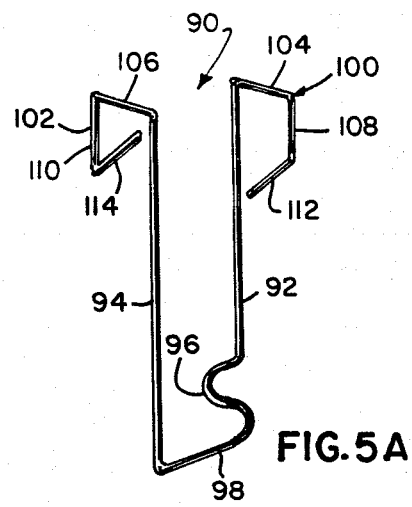
FIG. 4A (PRIOR ART)
FIG. 5A
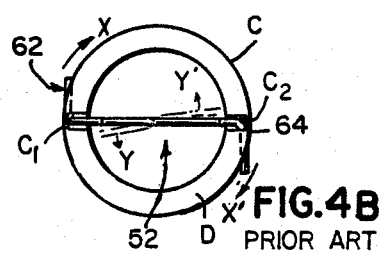
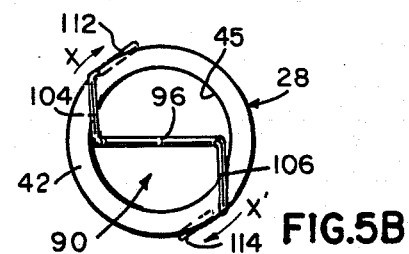
FIG. 4B PRIOR ART
FIG. 5B
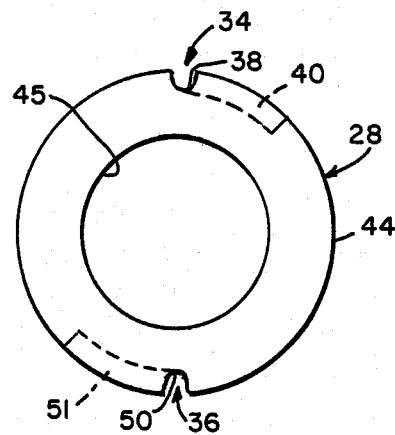
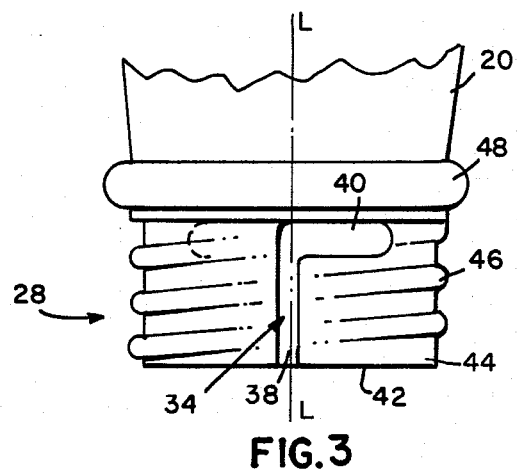
FIG. 2
FIG. 3

ELECTRIC LAMP WITH IMPROVED SELF-MOUNTING FRAME MEMBER

This is a continuation of co-pending application Ser. No. 729,373 filed on May 1, 1985, now abandoned.

CROSS REFERENCE TO COPENDING APPLICATIONS

In copending U.S. patent application, Ser. No. 469 841 filed Feb. 25, 1983, by Blaisdell et al, assigned to GTE Products Corporation, a frame assembly for mounting a light source capsule within an outer envelope of an electric lamp is disclosed.

TECHNICAL FIELD

This invention relates to electric lamps and more particularly to such lamps having a self-mounting frame member for supporting a light-source capsule within an outer envelope.

BACKGROUND ART

Under the existing art, the manufacture of a double-enveloped electric lamp typically involves the following steps. A light-source capsule having two lead-in wires is mounted on a glass stem support. The capsule and stem are inserted into the outer envelope. The glass stem support is flame sealed to the glass outer envelope. The outer envelope is evacuated, a desired fill gas may be introduced into the outer envelope, and the outer envelope is hermetically sealed. A lamp base is mounted on and cemented to the neck of the outer envelope. One of the capsule lead-in wires is soldered to the insulated tip of the base. The second lead-in wire is soldered or welded to the outer shell of the base.

The described manufacturing process is relatively costly. The fabrication of a hermetic seal between the lead-in wires and glass stem and between the stem and outer envelope requires considerable technological skill and quality control.

A solution to the aforementioned problem is described in the above referenced copending Application (Ser. No. 469,841), which is a dual envelope electric lamp having a self-mounting frame member for supporting a light source capsule within an outer envelope. The frame assembly secured to the neck portion of the outer envelope by mounting means. which form part of the frame assembly, and a base that makes contact with mounting means and is mounted onto the neck portion (see FIG. 4B). The frame assemblies described therein are comprised of more than one structural element.

In U.S. Pat. No. 4,500,948, "One Piece Frame For An Electric Lamp," issued to Blaisdell et al on Feb. 19, 1985, replacement frame assemblies are described therein which are comprised of a single element, such as a single sheet of material or a single strand of wire that are formed into the requisite shape (see FIG. 4A). The contents of U.S. Pat. No. 4,500,948 is hereby incorporated by reference.

In an electric lamp using a single wire frame assembly with a screw-on type base (Edison type), an undesirable twist or rotational movement in the frame assembly arose while mounting the base onto the outer envelope. Such a twist could later cause weaknesses to develop at points where the capsule is mounted onto the frame assembly. In addition, the formation of cross axis grooves (see FIG. 4B) on the end of the outer envelope to accommodate the frame assembly is a potential source of shrinkage (or waste) due to cracking during assembly of the lamp.

It is believed, therefore, that a dual envelope electric lamp which can be manufactured by a simpler process, assembled with less shrinkage and provides means for substantially preventing rotational movement in the frame assembly during mounting of the base to the outer envelope would constitute an advancement in the art.

DISCLOSURE OF THE INVENTION

Therefore, it is a primary object of this invention to enhance the art of electric lamps and particularly such lamps having a frame member for supporting a light source capsule within an outer envelope.

It is another object of the present invention to provide an improved self-mounting frame member for a dual envelope electric lamp that includes means for substantially preventing rotational movement of the frame member upon mounting of a base member on a neck portion of the outer envelope.

In accordance with an aspect of the present invention, there is provided an electric lamp having an outer envelope including a neck portion and a frame member with mounting means as part thereof positioned within the outer envelope and mounted on the neck portion using elastic and frictional forces. A light-source capsule is mounted on a portion of the frame member and is located within the outer envelope; a base member is mounted on the neck portion in contact with mounting means of the frame member. The improvement in the electric lamp comprises the inclusion of means for substantially preventing rotational movement of the frame member when the frame member is mounted and secured by the base member. Rotational movement preventing means is located about the neck portion and is in operative contact with the base member.

BRIEF DESCRIPTION OF THE DRAWINGS

FIG. 2 is an enlarged sectional plan view along line 2—2 of FIG. 1 with parts removed for clarity;

FIG. 3 is an enlarged elevational view of the neck-portion of the outer envelope of the embodiment of the invention shown in FIG. 1;

FIG. 4A is an enlarged pictorial view of one clamp portion of a prior art frame member;

FIG. 4B is a top view of the prior art frame member and prior art neck portion of the outer envelope;

FIG. 5A is an enlarged pictorial view of a frame member utilized in the embodiment of the invention shown in FIG. 1;

FIG. 5B is a top view of the frame member in the neck portion of the outer envelope;

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

As used herein, the term "light-source capsule" denotes a halogen capsule of a tungsten halogen incandescent lamp, an arc tube of an arc discharge lamp; or any light-emitting capsule within the outer envelope of a lamp.

The term "elastic" herein is defined as the property of a body, when deformed, to return to its normal configuration automatically as the deforming forces are removed. The term "friction" herein is defined to be the force which opposes relative motion between two touching bodies caused by the respective properties of the surfaces of each body which are in contact with each other. Neither "elastic" nor "friction" as used herein shall include any force which opposes relative motion between two bodies caused by the fusion of one body with the other, such fusion including any glass-to-glass or glass-to-metal seal.

Figure 1:
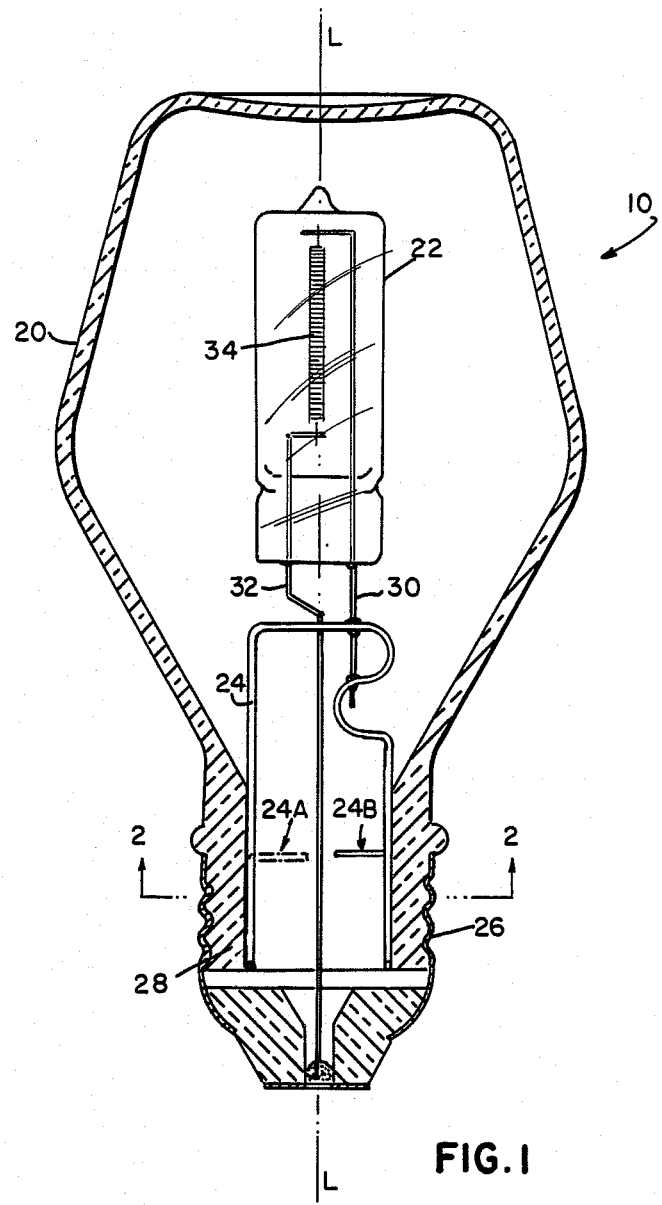
FIG. 1 is a sectional view of one embodiment of the present invention.

Referring to the drawings with greater particularity, FIG. 1 shows one embodiment of the invention, being lamp 10 having a longitudinal axis L and comprising an outer-envelope 20, a light-source capsule 22, a frame member 24, a base member 26 and a neck-portion 28. Frame member 24 has mounting means 24A and 24B as part thereof that will slidably engage neck portion 28. Capsule 22 in this instance is a tungsten halogen incandescent capsule with a first lead-in wire 30, a second lead-in wire 32, and a tungsten filament 34 extending between the internal terminations of lead-in wires 30 and 32. Capsule 22 in this embodiment is mounted on frame member 24 by means of lead-in wire 30.

FIGS. 2 and 3 illustrate neck portion 28 having two diametrically opposed pairs of interconnecting grooves, 34 and 36. In FIG. 2, groove 34 comprises connecting grooves 38 and 40 while groove 36 comprises connecting grooves 50 and 51. Grooves 38 and 50 are formed on outside surface 44 of neck portion 28 and run from a grooveless brim 42 to grooves 40 and 51, respectively. Neck portion 28 also has an inside surface 45. Grooves 40 and 51 both point in the direction of advancing thread 46, i.e., in the direction of rotation of base member 26 when it is mounted on neck portion 28.

Neck portion 28 has thread 46 formed therein; the thread extends approximately from brim 42 to ridge 48. Thread 46 is matched with the inside thread of base member 26 such that base member 26 may be mounted by being screwed onto neck portion 28. Groove 38 is formed into outside surface 44 and thread 46. Groove 38 proceeds from brim 42 toward ridge 48 running parallel to central axis L and traversing thread 46 until groove 38 meets groove 40. Groove 40 is formed in outside surface 44 and thread 46; it is perpendicular to groove 38; it proceeds from groove 38 in the direction that thread 46 advances toward ridge 48.

Referring now to FIGS. 4A and 4B, in FIG. 4A there is illustrated a pictorial view of a one-piece frame member 52 which is described in issued U.S. Pat. No. 4,500,948 to Blaisdell et al. The description of the frame members, including that of frame member 52 is hereby incorporated by reference. In FIG. 4B, frame member 52 is shown in position in the neck C of an outer envelope. Neck C has a cross axis groove, designated by $C_1$ and $C_2$ formed in the brim D which partially secure frame member 52. In order to fully secure such a frame member a base member is placed about neck C and twisted on over the legs (62 and 64) of frame member 52 until contact is made with a ridge similar to ridge 48. Unfortunately, as also illustrated in FIG. 4B, frame member 52 exhibits a permanent stressed deformation Y - Y' (invisible lines and arrows) when the base member is screwed on neck C. The rotation of frame member 52 in turn twists light source capsule 22 and causes stress forces to center on the capsule lead wire connections. Eliminating both the undesirable twist in the frame member and the need for a cross-axis groove would increase overall lamp life and diminish a potential source of shrinkage due to cracking during assembly of the lamp.

The present invention provides for an electric lamp with a light-source capsule mounted on a frame member therein, having means for substantially preventing rotational movement of the frame member when the frame member is mounted and secured by a base member. FIGS. 5A and 5B and 6A and 6B illustrate two embodiments of the present invention and views of the frame members positioned properly within neck portion 28. As seen in FIGS. 1 through 3, each of the frame members (90 and 120) to be described here slidably engages neck portion 28 of outer envelope 20 and is secured by base member 26 being screwed onto neck portion 28. Frame member 24 in FIG. 1 is also a representation of what the other frame members to be described (90 and 120) will look like once they've been mounted in a lamp. In the first embodiment (FIG. 5), means for substantially preventing rotational movement of the frame member includes grooveless brim 42 on neck portion 28 of envelope 20, two diametrically opposed pairs of interconnecting grooves, 34 and 36, formed in outer surface 44 and a frame member 90 having mounting means as part thereof.

In FIG. 5A, frame member 90 has legs 92 and 94, a loop 96, a bridge 98 interconnecting legs 92 and 94 and mounting means comprised of feet 100 and 102. Foot 100 is comprised of connected segments 104, 108 and 112, and foot 102 is comprised of connected segments 106, 110 and 114. Loop 96 provides both a mount for the light-source capsule and a reciprocating force when frame member 90 is under a compressive force within neck portion 28. Frame member 90 is positioned in contact with inner surface 45 with mounting means positioned about brim 42 and mated with pairs of interconnecting grooves 34 and 36. Specifically, legs 92 and 94 contact opposite sides of inner surface 45, segments 104 and 106 are in contact with brim 42, segments 108 and 110 mate with grooves 38 and 50, respectively, and segments 112 and 114 are mated with and protrude tangentially from grooves 40 and 51, respectively. Feet 100 and 102 are held securely within interconnecting grooves 34 and 36 by mounted (Edison type screw on) base member 26.

FIG. 5B illustrates frame member 90 positioned within envelope 20 and mounted on neck portion 28 when viewed up through portion 28 and loop 96 here represents the rest of frame member 90 when viewed in this manner. Legs 92 and 94 are positioned in contact with inner surface 45 of neck portion 28 with segments 104 and 106 being normal to loop 96. Inner surface 45 opposes any movement of legs 92 and 94 when a force is applied to segments 112 and 114 in directions X and X'. Having segments 104 and 106 normal to loop 96 results in less rotational force being applied to legs 92 and 94 in the instance where the mounting of frame member 90 is loose inside neck portion 28. Base number 26 exerts elastic and frictional forces on frame member 90 during mounting such that legs 92 and 94 press against inner surface 45 without rotational forces being exerted on the portion of frame member 90 within envelope 20.

Figure 6A:
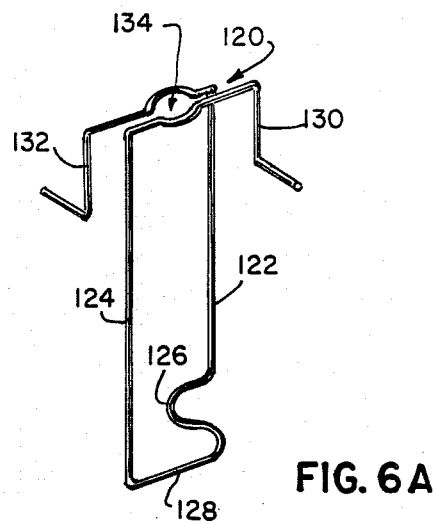
FIG. 6A is an enlarged pictorial view of another frame member.
Figure 6B:
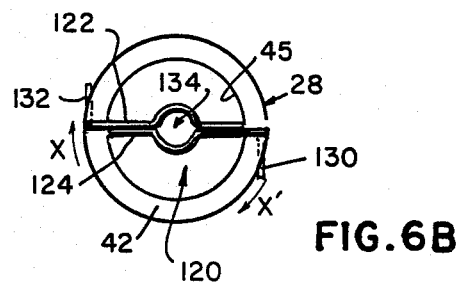
FIG. 6B is a top view of the frame member in the neck portion of the outer envelope.

FIGS. 6A and 6B illustrate a pictorial view and a view through neck portion 28 of another embodiment of the present invention. Particularly, means for preventing rotational movement here includes the neck and envelope construction of the previous embodiment such as grooveless brim 42 and grooves 34 and 36 in neck portion 28 of envelope 20 (partially illustrated in FIG. 6B). FIG. 6A illustrates frame member 120 having legs 122 and 124, a loop 126 a bridge 128 interconnecting legs 122 and 124 and mounting means comprised of feet 130 and 132. Frame member 120 is positioned in contact with inner surface 45 with mounting means positioned about brim 42 and mated with interconnecting grooves 34 and 36. Legs 122 and 124 contact sides of inner surface 45, extend to opposite sides of surface 45 of neck portion 28 and are in contact with brim 42. Legs 122 and 124 form an opening 134 which allows passage of a current-carrying wire to the light-source capsule.

In FIG. 6B, legs 122 and 124 are shown lying in the same plane and will oppose each other to eliminate any rotational movement when a force is applied in directions X and X' to feet 130 and 132. Feet 130 and 132 are held securely within interconnecting grooves 34 and 36 by mounted (Edison type screw on) base member 26. Base member 26 exerts elastic and frictional forces on frame member 120 during mounting such that legs 122 and 124 are pressed against each other with substantially equal and opposite forces without rotational forces being exerted on the portion of frame member 120 located within outer envelope 20. The portion of legs 122 and 124 about opening 34 can also be welded together if desired, but a single-piece, unwelded design is less costly and allows for speedier production.

The frame members of the present invention are sufficiently rigid to provide support for mounting the light source thereon and can be formed from a single strand of electrically conductive wire (resulting in a one-piece body). The frame members may include locking means for securely engaging the frame member, the base member and the outer envelope. Locking means includes forming feet 100 and 102 or 130 and 132 (of frame members 90 and 120, respectively) with sharp tips that will become embedded into base member 26 if rotated in the direction of dismounting. Once base member 26 is fully mounted, base member 26 is "locked" in place.

While there have been shown what are at present considered to be the preferred embodiments of the invention, it will be apparent to those skilled in the art that various changes and modifications can be made herein without departing from the scope of the invention as defined by the appended claims.

I claim:
1. A lamp having a central axis comprising:
 (a) an outer envelope enclosing an interior, said outer envelope having a bulbous body, a cylindrical adjoining neck open at one end, and a grooveless brim on said open end of said neck, said neck having an exterior surface with two opposed L-shaped grooves formed therein, each of said grooves having first and second portions intersecting in a right angle, said first portion running from said brim parallel to said central axis to a point of intersection with said second portion, said second portion running from said point of intersection in a plane perpendicular to said central axis;
 (b) a stiff wire frame within said outer envelope, said frame having a bridge and two adjoining legs, each of said legs having a foot opposing said bridge, each foot being formed such that said foot crosses said grooveless brim in a non-radial direction and fits within said first and second groove portions when pressed into said groove portions;
 (c) a light-source capsule within said outer envelope mounted on said frame, said light-source capsule having two lead-in wires;
 (d) a base mounted on said neck over said feet within said receiving grooves such that said base presses each of said feet securely into its respective groove whereby said frame is rigidly mounted on said neck by means of mechanical and frictional forces, said base having two electrical poles;
 (e) means for electrically coupling said lead-in wires and said electrical poles; and
 (f) said non-radial crossings of said brim by said formed wire feet being such that no twisting torque is exerted on said frame within said outer envelope as a result of pressing said feet into said receiving grooves.

2. A lamp having a central axis comprising:
 (a) an outer envelope enclosing an interior, said outer envelope having a bulbous body, a cylindrical adjoining neck open at one end, and a grooveless brim on said open end of said neck, said neck having an exterior surface with two opposed L-shaped grooves formed therein, each of said grooves having first and second portions intersecting in a right angle, said first portion running from said brim parallel to said central axis to a point of intersection with said second portion, said second portion running from said point of intersection in a plane perpendicular to said central axis;
 (b) a stiff wire frame within said outer envelope, said frame having a bridge and two adjoining legs, each of said legs having a foot opposing said bridge, each foot being formed such that said foot extends across said opening of said neck juxtaposed with said other foot, each foot then crossing said grooveless brim in a substantially radial direction and fitting within said first and second groove portions when pressed into said groove portions;
 (c) a light-source capsule within said outer envelope mounted on said frame, said light-source capsule having two lead-in wires;
 (d) a base mounted on said neck over said feet within said receiving grooves such that said base presses each of said feet securely into its respective groove whereby said frame is rigidly mounted on said neck by means of mechanical and frictional forces, said base having two electrical poles;
 (e) means for electrically coupling said lead-in wires and said electrical poles;
 (f) said juxtaposed portions of said feet being such that forces exerted on each foot as a result of pressing said feet into said receiving grooves are substantially equal and opposite whereby no twisting torque is applied to said frame within said outer envelope.

3. A lamp as described in claim 1 wherein at least one of said feet includes means for securely locking said base on said neck after said base has been mounted on said neck.

4. A lamp as described in claim 2 wherein at least one of said feet includes means for securely locking said base on said neck after said base has been mounted on said neck.

5. A lamp as described in claim 1 wherein said neck and base are threaded.

6. A lamp as described in claim 2 wherein said neck and base are threaded.

7. A lamp as described in claim 1 wherein said frame is formed from a single strand of wire.

8. A lamp as described in claim 2 wherein said frame is formed from a single strand of wire.

* * * * *